Figure 1:
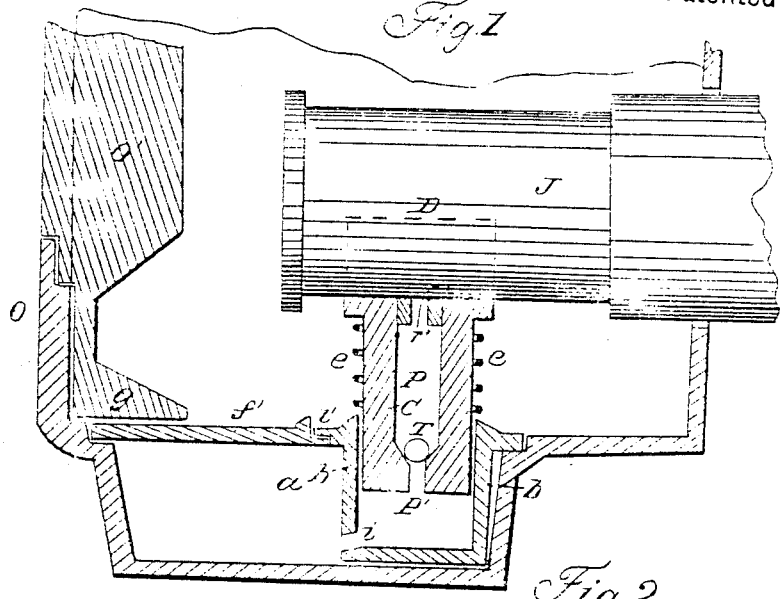
Figure 2:
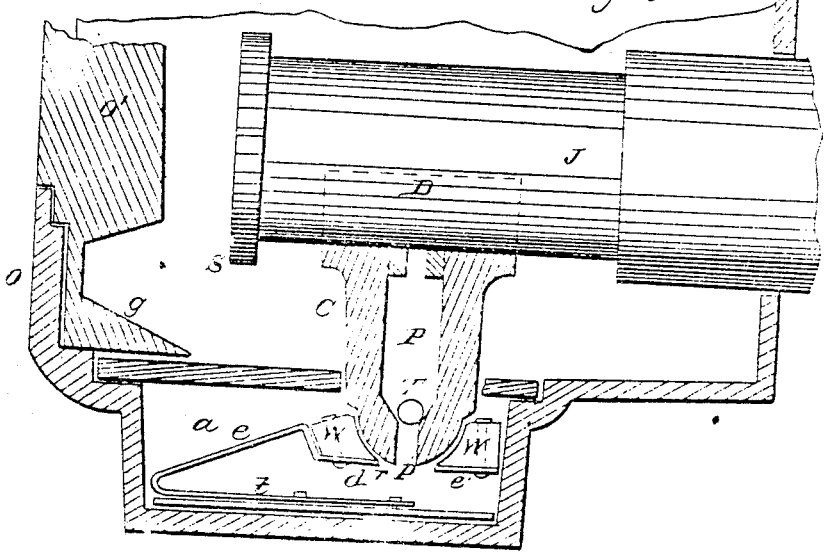
Figure 3:
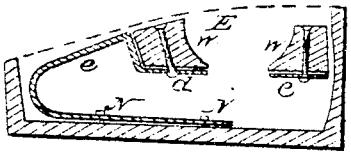

BEST AVAILABLE COPY

W. BAKER.

Car-Axle Box.

A.I.B. 233.

A. I. Patented May 3, 1859.

T 354/172

Witnesses.

R. C. Baker

G. A. Clark

Inventor.

William Baker

N. ... WASHINGTON, D. C.